United States Patent
Russell

[15] 3,665,028

[45] May 23, 1972

[54] PROCESS FOR PREPARATION OF BORATE ESTERS

[72] Inventor: Joseph L. Russell, Ridgewood, N.J.

[73] Assignee: Halcon International, Inc., New York, N.Y.

[22] Filed: Mar. 6, 1968

[21] Appl. No.: 710,781

Related U.S. Application Data

[63] Continuation-in-part of Ser. No. 593,646, Nov. 14, 1966, abandoned.

[52] U.S. Cl..................260/462 A, 260/617 H, 260/631 B, 260/639 B, 260/586 B, 260/597 R
[51] Int. Cl. ..........................................................C07f 5/04
[58] Field of Search............260/462 A, 631, 632 CB, 631 B, 260/586 B, 462, 462 R, 617 H, 597 R

[56] References Cited

UNITED STATES PATENTS

| | | | |
|---|---|---|---|
| 1,947,989 | 2/1934 | Hellthaler et al. | 260/462 A X |
| 2,439,513 | 4/1948 | Hamblet et al. | 260/631 X |
| 2,609,395 | 9/1952 | Dougherty et al. | 260/617 X |
| 2,615,921 | 10/1952 | Dougherty et al. | 260/617 X |
| 2,684,984 | 7/1954 | Finch | 260/631 X |
| 2,689,259 | 9/1954 | Schechter | 260/462 |
| 3,243,449 | 3/1966 | Winnick | 260/462 A X |

FOREIGN PATENTS OR APPLICATIONS

| | | | |
|---|---|---|---|
| 892,723 | 3/1962 | England | 260/462 A |
| 930,095 | 7/1963 | England | 260/631 |
| 964,869 | 7/1964 | England | 260/631 |

*Primary Examiner*—Leon Zitver
*Assistant Examiner*—Leo De Crescente
*Attorney*—William C. Long, Morris Wiseman and David Dick

[57] ABSTRACT

This invention relates to the oxidation of hydrocarbons in the presence of boron compounds. More specifically, the invention teaches a method of improving the selectivity of the reaction and the distribution of the oxidation products.

11 Claims, No Drawings

PROCESS FOR PREPARATION OF BORATE ESTERS

CROSS-REFERENCE

This application is a continuation-in-part of copending application, Ser. No. 593,646 filed Nov. 14, 1966, now abandoned.

BACKGROUND OF THE INVENTION

Recently, the oxidation of hydrocarbons, most notably cyclohexane, in the presence of boron compounds has achieved much commercial importance as a major step in the production of cyclohexanol, cyclohexanone, adipic acid and phenol. The success of the process is dependent on proper control of processing variables as illustrated in U. S. Pat. No. 3,243,449. While the aforesaid patent represents a marked step forward in the art, economic factors which become greatly significant in processes for producing large volume basic chemicals necessitate the refinement of the process to the highest degree.

It has been found that up to 10 percent of the oxidized product obtained from the reaction is composed of peroxidic materials. Hitherto, peroxidic materials were permitted to decompose during the various distillation, hydrolysis and refinement operations with little regard to the mechanism of the decomposition reaction. It has now been determined that these materials have been decomposing primarily into undesirable by-products.

DESCRIPTION OF THE INVENTION

In accordance with this invention, it has been discovered that both the selectivity of the oxidation and the desired product distribution may be enhanced by the controlled decomposition of the peroxidic materials formed during the oxidation. Controlled decomposition is effected by "heat soaking" the reactor effluent at a temperature between 125° and 200° C., preferably between 140° and 180° C., for a period of at least 5 minutes, preferably between 15 and 60 minutes. Longer periods, of course, may be used but they are commercially undesirable.

Where the reaction is performed batchwise the heat soaking may take place directly in the oxidation reactor. In a continuous process a separate soak vessel may be conveniently employed. It is necessary that the heat soaking take place substantially in the absence of molecular oxygen. The presence of significant amounts of oxygen will retard the decomposition of the peroxidic materials.

Further improvements in selectivity are obtained by conducting the hereinabove described controlled peroxidic materials decomposition in the presence of an inert stripping vapor, i.e., by stripping the reactor effluent during the heat soaking. The stripping vapor appears to increase the rate of deperoxidation over that obtained in a corresponding deperoxidation in the absence of stripping vapor, in addition to improving selectivity. The stripping vapor rate employed depends primarily upon economic considerations. Generally, however, stripping vapor rates from two to 65 moles of vapor are employed per mol of oxidized material in the reactor effluent to be deperoxidized with higher rates giving better results. Preferable stripping vapor rates are between 20 and 25 moles per mol of oxidized material in the reactor effluent. The "moles of oxidized material in the reactor effluent" are determined on a hydrocarbon free basis, i.e., does not include unconverted hydrocarbon present in the reactor effluent. Suitable stripping vapors include the hydrocarbons and especially the vapors of the hydrocarbon being oxidized (e.g., cyclohexane, cyclooctane, n-pentane etc.) as well as those gases inert to the system, e.g., nitrogen, helium, argon, carbon dioxide, etc.

While it is believed that the peroxidic materials formed during the oxidation are hydroperoxides, this has not been conclusively established. It is therefore intended that the term "peroxide materials," as used herein, refers to any organic compounds formed, whether, strictly speaking, they are hydroperoxides or peroxides or the like, so long as they contain a peroxy oxygen atom.

The oxidation of this invention is carried out in a batchwise or continuous manner by contacting gaseous molecular oxygen with a mixture of liquid hydrocarbon and a boron compound as hereinafter described. The oxidation reaction temperatures must be in the range from 140° to 180° C. and preferably 160° to 170° C. Illustrative pressures are from 10 to 800 p.s.i.g.

For example, in the case of the oxidation of cyclohexane with an oxidizing gas composed of air diluted with nitrogen to a volumetric concentration of oxygen of 10 percent, a reaction temperature of 165° C. is preferred. At this temperature, the vapor pressure of the liquid cyclohexane is about 105 p.s.i.g.

The oxidation of this invention is carried out so that about 4 to 25 percent, desirably 8 to 20 percent, and preferably 10 to 15 percent, of the hydrocarbon is oxidized per pass in a continuous system or per oxidation cycle in a batch operation.

It is desirable to operate at conditions of substantially complete oxygen consumption in order to make the most efficient use of the compressed oxidizing gas and to avoid explosion hazards.

Hydrocarbons which are oxidized by the process of this invention may be both saturated and unsaturated and include cyclopentane, cyclohexane, cycloheptane, cyclooctane, methylcyclohexane, and the dimethylcyclohexanes, cyclododecane, n-pentane, n-hexane, n-heptane, the methylpentanes and higher paraffins. Preferred materials have from four to 30 carbon atoms per molecule.

In preferred operation, an admixture of the hydrocarbon together with a selectivity promoting amount of metaboric acid or lower boric acid hydrate is formed. Where a slurry of ortho-boric acid in the hydrocarbon is first formed, it is subjected to a dehydration treatment (as by passing a gas therethrough at elevated temperature) to dehydrate at least part and preferably substantially all of the ortho-boric acid.

The boron compound is generally employed in amounts of at least 1 mol of boron compound (expressed as meta-boric acid) per 6 mols of hydrocarbon oxidized. Since economic conversions are at least 4 percent of the hydrocarbon, this corresponds to at least about 0.4 percent boron compound (expressed as meta-boric acid) by weight of the hydrocarbon-boron compound admixture. Due to problems of slurry handling in the reaction and solids separation dificulties, it is generally not desirable to employ amounts of the boron compound (expressed as meta-boric acid) in excess of about 20 percent by weight of the hydrocarbonboron compound admixture.

The boron compounds employed may be the lower hydrates of boric acid, most preferably meta-boric acid, but also including boron oxide and tetraboric acid. Borate esters, such as cyclohexyl meta-borate, methyl borate and ethyl borate, may also be used. The lower hydrates are conveniently formed by the removal of water from ortho-boric acid. The partial pressure of water in the vapors over the reaction mixture is controlled so that the lower hydrates will not be converted to higher hydrates.

Although pure oxygen can be used, it is preferred to use molecular oxygen in admixture with an inert gas such as nitrogen. Concentrations of oxygen, greater or lesser than those found in air, equaling 4 to 25 percent can be used. It is generally preferred to employ oxygen concentrations of 10 percent by volume or less in the oxidant gas to avoid possible formation of explosive mixtures.

As more fully described in U. S. Pat. No. 3,243,449, it is desirable to control the water partial pressure in the reactor. Water is unavoidably present as a by-product of the reaction (between 1.0 and 1.5 mols of water are formed per mol of oxygen consumed) and may also enter the reactor with the feed hydrocarbon or gases.

A particularly effective means of removing water, during the oxidation reaction, is to withdraw (boil-up) a gaseous mixture comprising the inert gas in the feed oxidant stream, any unconsumed oxygen, water vapor and hydrocarbon vapor continuously from the reaction zone. The hydrocarbon vapor may be condensed, at least partially separated from water, and returned to the reactor as a liquid.

In practice of this invention wherein the hydrocarbons which are oxidized have from four to seven carbon atoms per molecule, and the oxidation is carried out in the absence of solvent and large amounts of lower hydrates, the process often requires positive heat input in order to insure sufficient hydrocarbon boil-up (as more fully considered in U. S. Pat. No. 3,243,449) while operating at the desired reaction temperature. This can be accomplished in a variety of ways, preferably, by heating the hydrocarbon separated in the boil-up prior to its return to the reactor. If necessary the hydrocarbon may be vaporized and introduced into the reaction zone as vapor.

Heat economics are achieved by heat exchange between the hydrocarbon returning to the reaction zone and vapors exiting from the reaction zone; if direct contact is used for such heat exchange, further stripping of water from returning hydrocarbon is also accomplished. Heat necessary to sustain the reaction is preferably provided by heating the recycle hydrocarbon prior to introduction into the reaction zone. Alternatively, heat can be provided through the reactor walls, by means of heating coils in the reaction zone, and the like.

At the termination of the oxidation, the reactor effluent is subjected to the heat soak period, either in the same or a separate vessel, and in the presence or absence of stripping vapor, as heretofore discussed. After the heat soaking is completed, the effluent contains a substantial amount of the borate ester of the alcohol. Substantially no peroxidic material remains. In order to recover the alcohol as such, it is desirable to subject the oxidation reaction mixture (after removal of unreacted hydrocarbon) to a hydrolysis. The alcohol liberated can readily be recovered by distillation, for example, by adding water to the oxidation reaction mixture after hydrocarbon removal and heating, e.g., to 5°–150° C. Other known techniques such as alcoholysis and transesterification, can be employed.

In order to illustrate the invention, attention is directed to the following examples:

EXAMPLE I

In order to determine the effect of the heat soaking on the selectivity of the reaction to cyclohexanol and cyclohexanone, a series of runs was performed using 400 grams of cyclohexane, 14 grams meta-boric acid (3.5 percent) and a gas containing 10 percent of molecular oxygen. The reactions were carried out at 165° C. and 125 p.s.i.g. In each case after 6 liters of oxygen were absorbed the material was dischared from the autoclave. Where no heat soak was employed, the discharge was passed to a flash tank at a temperature of 92° C. to separate the cyclohexane and the remaining reaction effluent was hydrolyzed in the usual manner. In the second pair of runs, the reaction effluent was heat soaked for 30 minutes at 165° C. and 125 p.s.i.g. with no boil up. The following results were obtained:

TABLE I

| No Heat Soak | Selectivity % | Conversion % | Cyclohexanol/ Cyclo- hexanone ratio |
|---|---|---|---|
| | 84.5 | 7.3 | 5.38 |
| | 84.9 | 7.7 | 5.52 |
| Ave. | 84.7 | 7.5 | |
| 30 min. Heat Soak at 165°C. | | | |
| | 85.2 | 7.4 | 9.2 |
| | 86.5 | 7.0 | 6.88 |
| Ave. | 85.9 | 7.2 | |

In the runs cite above (Table I) the peroxidic material content (calculated as cyclohexyl hydroperoxide) varied slightly but averaged 9 percent by weight of the total oxidized products (after hydrolysis and removal of boric acid). If this all decomposed to cyclohexanol and cyclohexanone, it would account for about 8 percent in yield. The 1.2 percent average improvement in selectivity improvement realized, therefore, represents an increase in the selectivity of conversion of peroxide to cyclohexanol and cyclohexanone of about 15 percent. This is clearly an unexpected advantage.

The higher cyclohexanol/cyclohexanone ratio is important because experience has shown that this is indicative of a higher reaction selectivity. Also, it is known in the art that cyclohexanol is more efficiently converted to adipic acid by nitric acid than is cyclohexanone. This is one of the major commercial uses of the cyclohexanol-cyclohexanone reaction product.

EXAMPLE II

To show the effect of the heat soaking procedure of the instant invention on the selectivity of the reaction product, a series of runs were performed batchwise in a one liter oil jacketed reactor equipped with a turbine agitator. The oxidations were performed on 400 grams of cyclohexane using a gas containing 10 percent of molecular oxygen. The reaction temperature was maintained at 165° C. and the pressure at 125 p.s.i.g. A comparison was made between the cyclohexanol/cyclohexanone ratio of (1) the effluent discharged immediately after oxidation with (2) the effluent which was heat soaked to selectively decompose the peroxidic material in accordance with the invention. The runs were made at varying meta-boric acid levels as indicated in the following table:

TABLE II

| | | | | Cyclohexanol/Cyclohexanone Ratio | | |
|---|---|---|---|---|---|---|
| Run No. | Meta-Boric Acid g. | Wt. % | $O_2$ ab-Sorbed | Without Heat soaking | With Heat soaking | Time of heat soak at 165°C min. |
| 1 | 10.4 | 2.6 | 6.08 | 5.7 | 8.4 | 30 |
| 2 | 10.4 | 2.6 | 6.11 | 3.9 | 5.4 | 30 |
| 3 | 14.0 | 3.5 | 6.1 | 5.5 | 7.0 | 100 |

The above data clearly show that the ratio of cyclohexanol to cyclohexanone is improved in each and every instance as a result of the heat soaking of the invention. This clearly indicates a more selective decomposition of the peroxide.

EXAMPLE III

This example shows the effect of the heat soaking of the invention on one and two stage continuous oxidation reactions. The liquid feed to the reactor contained 98.1 percent of cyclohexane, 0.5 percent cyclohexanone and 1.4 percent meta-boric acid. The oxidation was run with 10 percent $O_2$ in nitrogen. The reactors were maintained at 165° C. at a pressure of 125° p.s.i.g. The liquid within each reactor was apparently 1.5 gallons. In all cases the gas rate was 0.44 CFM (measured at 70° F. and one atmosphere pressure) in each reactor.

Runs 1 to 3 were in a single stage continuous oxidation employing the heat soaking of the invention. Runs 4 to 6 represent the conventional procedure wherein no heat soaking takes place. Runs 7 and 8 show the effect of heat soaking on a two stage continuous oxidation. Runs 9 to 11 set forth a two stage continuous oxidation without the heat soaking. The heat soaking, where employed, was performed at 175° C. The selectivities obtained and related data are shown in the following table:

TABLE III

One stage continuous oxidation

| Run number | Selectivity, percent | | | Conv., percent | Percent peroxide in effluent | Avg. time (min.) | Percent hydro- peroxide after hold |
|---|---|---|---|---|---|---|---|
| | Total | Cyclo- hexanol | Cyclo- hexanone | | | | |
| 1 | 89.0 | 79.6 | 9.4 | 3.5 | 0.56 | 20 | 0.08 |
| 2 | 89.1 | 80.2 | 8.9 | 3.2 | 0.52 | 20 | 0.10 |
| 3 | 90.8 | 81.8 | 9.0 | 3.3 | 0.58 | 20 | 0.07 |
| Avg | 89.6 | 80.5 | 9.1 | 3.3 | 0.55 | | |
| 4 | 86.9 | 68.5 | 18.0 | 2.8 | 0.63 | | |
| 5 | 86.0 | 66.6 | 19.4 | 2.7 | 0.57 | | |
| 6 | 83.9 | 66.8 | 17.1 | 2.6 | 0.57 | | |
| Avg | 85.6 | 67.3 | 18.3 | 2.7 | 0.59 | | |

Two stage continuous oxidation

| | | | | | | | |
|---|---|---|---|---|---|---|---|
| 7 | 84.7 | 76.2 | 8.5 | 7.6 | 0.58 | 30 | 0.02 |
| 8 | 83.8 | 76.0 | 7.8 | 6.6 | 0.51 | 30 | 0.02 |
| Avg | 84.3 | 76.1 | 8.2 | 7.1 | 0.54 | | |
| 9 | 83.3 | 72.9 | 10.4 | 6.0 | 0.58 | | |
| 10 | 83.5 | 73.4 | 10.1 | 6.4 | 0.62 | | |
| 11 | 82.4 | 73.5 | 8.9 | 7.1 | 0.65 | | |
| Avg | 83.1 | 73.3 | 9.8 | 6.5 | 0.63 | | |

The above data show that in the single stage the selectivity averaged 85.6 percent at 2.7 percent conversion according to conventional practice and 89.6 percent at 3.3 percent conversion with the heat soaking of the invention. This improvement in selectivity is particularly striking considering that higher conversion occurred in the series of runs where the heat soaking was used. Similarly in the two stages oxidation both the selectivity and the conversion were improved by following the procedure of the invention.

In the one stage oxidation, peroxidic material (calculated as cyclohexyl hydroperoxide) average 14–18 percent by weight of the total oxidized products (after hydrolysis and removal of boric acid.) If all of this decomposed to cyclohexanol and cyclohexanone it would account for about 12 to 15 percent in yield. The average improvement realized, therefore, represents an increase in the selectivity of conversion of the peroxidic material to cyclohexanol and cyclohexanone of about 30 percent.

Similarly the results from the two stage continuous oxidation show an increase in selectivity of conversion of peroxidic material to cyclohexanol and cyclohexanone of about 20 percent.

EXAMPLE IV

One stage continuous oxidations are run as described in Example III except that the heat soaking is carried out at different conditions. The results are summarized in the following table.

TABLE IV

| Run | Selectivity % to Cyclohexanol and cyclohexanone | Conver- sion | Heat Soaking time,min. | Heat Soaking Post Heating temp. °C |
|---|---|---|---|---|
| 1A | 82.1 | 4.1 | – | – |
| 1B | 85.2 | 4.3 | 120 | 125°C. |
| 2A | 85.0 | 2.0 | – | – |
| 2B | 89.1 | 2.8 | 60 | 150 |
| 3A | 86.1 | 3.6 | – | – |
| 3B | 88.4 | 3.8 | 10 | 200°C. |

EXAMPLE V

Runs 1B, 2B and 3B of Example IV are repeated with the employment of an inert stripping vapor during the peroxide decomposition. In each case, the stripping agent is vaporized cyclohexane. The following table set forth the pertinent data concerning these runs:

TABLE V

| Run | Selectivity, % to cyclohexanol and cyclohexanone | Stripping Vapor Rate, Moles/Mole of oxidized material |
|---|---|---|
| 1B | 86.4 | 10 |
| 2B | 91.2 | 25 |
| 3B | 91.4 | 50 |

EXAMPLE VI

The runs of Example V are repeated employing nitrogen as the stripping agent. Substantially identical results are obtained.

Having thus described the invention what is claimed and desired to protect by Letters Patent is:

1. A process for preparing a borate ester of an alcohol which comprises oxidizing a cycloalkane or alkane hydrocarbon by passing a gas containing molecular oxygen therethrough at 140° to 180° C. in the presence of a boron compound which is selected from the group consisting of meta boric acid, boron oxide and tetra boric acid and thereby forming a reaction product containing a borate ester formed from said boron compound, and peroxidic materials, discontinuing the passage of said gas containing molecular oxygen through said hydrocarbon and thereafter heat soaking said reaction product at 125° to 200° C. for at least 5 minutes so that additional amounts of said borate ester of said alcohol form.

2. The process of claim 1 wherein said hydrocarbon is an alkane.

3. The process of claim 1 wherein said (alkane) hydrocarbon is a cycloalkane having four to eight carbon atoms.

4. The process of claim 3 wherein said cycloalkane is cyclohexane.

5. The process of claim 1 wherein said heat soaking is at a temperature of from 140° to 180° C. for a period of at least 15 minutes.

6. The process of claim 1 wherein said reaction product is stripped during the heat soaking with a stripping vapor which is a hydrocarbon or an inert stripping gas.

7. The process of claim 6 wherein the amount of said stripping vapor is not greater than about 65 moles of said stripping vapor per mol of oxidized material present in said reaction product.

8. The process of claim 6 wherein the stripping vapor is composed of vapors of the hydrocarbon to be oxidized.

9. A process for preparing an alkanol which comprises contacting a cycloalkane or alkane hydrocarbon with a gas containing molecular oxygen in the presence of a boron compound which is selected from the group consisting of meta boric acid, boron oxide and tetra boric acid at a temperature of from 140° to 180° C., and thereby oxidizing a portion of said hydrocarbon to form a reaction mixture containing unreacted hydrocarbon, borate ester of said alkanol formed from said boron compound, and peroxidic materials, discontinuing said contacting of said gas containing molecular oxygen with said hydrocarbon, heat soaking said reaction mixture for at least 5 minutes at a temperature substantially in the same range as said oxidizing temperatures and hydrolyzing the borate ester of said alkanol to form an alkanol.

10. The process of claim 9 wherein said hydrocarbon is cyclohexane and said boron compound is meta-boric acid.

11. The process of claim 9 wherein said heat soaking is for a period of at least 15 minutes.

* * * * *